US010102459B2

(12) United States Patent
Nagasaka

(10) Patent No.: US 10,102,459 B2
(45) Date of Patent: Oct. 16, 2018

(54) PRINT CONTROL APPARATUS, METHOD AND PROGRAM OUTPUTS XPS DRAWING INSTRUCTIONS FROM AN APPLICATION TO CHANGE RESOLUTION OF TILE IMAGE

(71) Applicant: CANON KABUSHIKI KAISHA, Tokyo (JP)

(72) Inventor: Hitoshi Nagasaka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/362,500

(22) Filed: Nov. 28, 2016

(65) Prior Publication Data

US 2017/0154251 A1    Jun. 1, 2017

(30) Foreign Application Priority Data

Dec. 1, 2015  (JP) .................................. 2015-235017

(51) Int. Cl.
*G06K 15/02* (2006.01)
*G06F 3/12* (2006.01)

(52) U.S. Cl.
CPC ....... *G06K 15/1843* (2013.01); *G06F 3/1225* (2013.01); *G06F 3/1246* (2013.01); *G06F 3/1254* (2013.01); *G06K 15/1809* (2013.01); *G06K 15/1822* (2013.01); *G06K 2215/0057* (2013.01)

(58) Field of Classification Search
None
See application file for complete search history.

(56) References Cited

U.S. PATENT DOCUMENTS

2009/0219566 A1* 9/2009 Tanaka ................. G06F 21/608
                                                         358/1.15
2009/0284786 A1* 11/2009 Natori .................. G06F 17/212
                                                         358/1.15
2012/0212788 A1* 8/2012 Miyazaki ............ H04N 1/0402
                                                         358/474

FOREIGN PATENT DOCUMENTS

JP          2008-276745 A       11/2008

* cited by examiner

*Primary Examiner* — Benny Q Tieu
*Assistant Examiner* — Haris Sabah
(74) *Attorney, Agent, or Firm* — Canon U.S.A., Inc. IP Division

(57) ABSTRACT

In a case where a tile image drawing instruction is included in a Graphics Device Interface (GDI) drawing instruction output from a GDI application, there is a difference between a result of drawing the drawing instruction with a GDI printer driver and a result of drawing the drawing instruction with a V4 printer driver in some cases. In a case where an application of an output source of an XML Paper Specification (XPS) drawing instruction is a GDI application and a tile image drawing instruction is included in the XPS drawing instruction, the aspect of the embodiments performs modification of the tile image drawing instruction so that resolution of a tile image with which pattern drawing is performed in accordance with the tile image drawing instruction is changed.

20 Claims, 13 Drawing Sheets

FIG. 6A

```
<FixedPage Width="1122.56" Height="793.76" xmlns="http://schemas.openxps.org/oxps/v1.0" xml:lang="und">    ~601
    <!-- Microsoft XPS Document Converter (MXDC) Generated! Version: 0.3.9600.17415 -->
    <Canvas RenderTransform="1,0,0,1,19.2,19.36">
        <Path Data="F1 M 18.88,18.72 L 226.4,18.72 226.4,396.32 18.88,396.32 z" >
            <Path.Fill>
                <ImageBrush TileMode="Tile" ViewboxUnits="Absolute" Viewbox="0,0,57,57"
                ViewportUnits="Absolute" Viewport="0,0,9.12,9.12" ImageSource="../Resources/Images/1.PNG" />    }602
            </Path.Fill>
        </Path>
        <Path Data="F1 M 226.4,18.56 L 18.72,18.56 18.72,396.32 226.4,396.32 z" Stroke="#ff000000"    603
        StrokeThickness="0.5" StrokeLineJoin="Round" StrokeStartLineCap="Round" StrokeEndLineCap="Round" />
    </Canvas>
</FixedPage>
```

FIG. 6B

```
<?xml version= "1.0" encoding= "UTF-8"?>
- <psf:PrintTicket xmlns:psk="http://schemas.microsoft.co/windows/2003/08/printing/printschemakeywords" version="1"
xmlns:xsd="http://www.w3.org/2001/XMLSchema" xmlns:xsi="http://www.w3.org/2001/XMLSchema-instance"
xmlns:psf="http://schemas.microsoft.co/windows/2003/08/priting/printschemaframework"
xmlns:ns0000="http://schemas.microsoft.com/windows/2006/06/printing/printschemakeywords/microsoftxpsdocumentwriter">
```
610

FIG. 10

| ID | CONTENT (PAINT WITH CORRESPONDING PATTERN) |
|---|---|
| HS_BDIAGONAL | BACKWARD DIAGONAL HATCHING AT 45 DEGREES |
| HS_CROSS | HORIZONTAL AND VERTICAL CROSS-HATCHING |
| HS_DIAGCROSS | DIAGONAL CROSS-HATCHING AT 45 DEGREES |
| HS_FDIAGONAL | FORWARD DIAGONAL HATCHING AT 45 DEGREES |
| HS_HORIZONTAL | HORIZONTAL HATCHING |
| HS_VERTICAL | VERTICAL HATCHING |

FIG. 12

| GDI | HATCHING ID | HS_HORIZONTAL | HS_VERTICAL | HS_FDIAGONAL | HS_BDIAGONAL | HS_CROSS | HS_DIAGCROSS |
|---|---|---|---|---|---|---|---|
| XPS | | MXDC (CONVERSION FROM GDI TO XPS) | | | | | |
| | TILE IMAGE | ▭ | ▯ | ◹ | ◸ | ⊞ | ⊠ |
| | [FEATURE 1] SIZE (pixel) | 8 * 40 | 40 * 8 | 57 * 57 | 57 * 57 | 40 * 40 | 57 * 57 |
| | [FEATURE 2] AMPLITUDE (pixel) | 1.28 * 6.4 | 6.4 * 1.28 | 9.12 * 9.12 | 9.12 * 9.12 | 6.4 * 6.4 | 9.12 * 9.12 |

PRINT CONTROL APPARATUS, METHOD AND PROGRAM OUTPUTS XPS DRAWING INSTRUCTIONS FROM AN APPLICATION TO CHANGE RESOLUTION OF TILE IMAGE

BACKGROUND OF THE INVENTION

Field of the Invention

The aspect of the embodiments relates to print control using a printer driver.

Description of the Related Art

As to a printer driver for Windows, a shift from a Graphics Device Interface (GDI) printer driver which has been used as a main driver until now to an XML Paper Specification (XPS) printer driver (hereinafter, referred to as a V4 printer driver) has begun. The V4 printer driver is to be the main driver in the near future. The GDI printer driver is a driver which interprets a GDI drawing instruction to generate print data. The V4 printer driver is a driver which interprets an XPS drawing instruction to generate print data.

A conventional application outputs a GDI drawing instruction to the GDI printer driver when performing print processing. In this specification, such an application is referred to as a GDI application. On the other hand, a new application which is compatible with the V4 printer driver outputs an XPS drawing instruction to the V4 printer driver when performing print processing. Such an application which is capable of outputting the XPS drawing instruction is referred to as an XPS application. Particularly, in a period of the shift of printer drivers, the GDI application and the XPS application coexist and operate in one computer.

Further, even when the V4 printer driver becomes the main driver, the conventional GDI application outputs a GDI drawing instruction when performing print processing. Then, in a case where the GDI application performs print processing by using the V4 printer driver, an OS performs processing by which a GDI drawing instruction is converted into an XPS drawing instruction. Specifically, it is configured such that an MXDW (Microsoft XPS Document Writer) converts a GDI drawing instruction, which is output from the GDI application, into an XPS drawing instruction, and the XPS drawing instruction after the conversion is input to the V4 printer driver.

Japanese Patent Laid-Open No. 2008-276745 discloses a technique by which whether or not an XPS drawing instruction input to a printer driver is an XPS drawing instruction output from a GDI application is determined and printing is performed so as not to protrude from a printable region.

On the other hand, there are some cases in which a result of drawing by the V4 printer driver according to an XPS drawing instruction which is obtained by converting, by the MXDW, a GDI drawing instruction output from the GDI application is different from a result of drawing by the GDI printer driver. That is, a result of drawing of a GDI drawing instruction, which is output from the GDI application, by the GDI printer driver is different from a result of drawing by the V4 printer driver in some cases.

GDI drawing instructions include various drawing instructions. Examples of the GDI drawing instructions include a drawing instruction for giving an instruction of drawing repeatedly with a bitmap (image data) in an inside of a designated region, which is called a bitmap brush. In the GDI printer driver, it is possible to deal with the bitmap of the bitmap brush drawing instruction with resolution unique to the driver. Alternatively, it is possible for a user who performs printing to designate resolution for the bitmap brush via a UI screen of the GDI printer driver. The GDI printer driver is able to deal with the bitmap with resolution (for example, 600 dpi or 300 dpi) according to the designation of the user. In this manner, with processing using the GDI printer driver, a bitmap is to be drawn repeatedly with resolution (designated resolution of, for example, 600 dpi or 300 dpi) according to setting on a printer driver side.

On the other hand, in the case of performing print processing for a GDI drawing instruction, which is output from the GDI application, by using the V4 printer driver, the GDI drawing instruction is converted into an XPS drawing instruction by the MXDW as described above. In the conversion processing, the MXDW converts the bitmap of the bitmap brush drawing instruction into image data (referred to as a tile image) with fixed resolution (for example, 150 dpi). That is, the MXDW converts the bitmap brush drawing instruction into a tile image drawing instruction for repeatedly drawing a tile image with the fixed resolution. The tile image drawing instruction obtained by conversion by the MXDW in this manner is to be input to the V4 printer driver. That is, at a time point when the drawing instruction is input to the V4 printer driver, the resolution of the image data, which is used for repeating pattern drawing, has already been decided by the MXDW. Therefore, in the processing using the V4 printer driver, the repeating drawing is performed with the decided resolution (for example, 150 dpi). Thus, a result output by the V4 printer driver via the MXDW has different resolution compared with that of an output result of the GDI printer driver in some cases.

FIGS. 1A, 1B, and 1C are views illustrating examples of output results of the GDI printer driver and an output result of the V4 printer driver. Each background image in FIGS. 1A, 1B, and 1C is an image output as a result of a bitmap brush drawing instruction. FIG. 1A and FIG. 1B illustrates results of drawing of the bitmap brush drawing instruction by the GDI printer driver with resolution of 600 dpi and 300 dpi, respectively. FIG. 1C illustrates a result of drawing of the same bitmap brush drawing instruction by the V4 printer driver, in which the drawing is performed with resolution of 150 dpi which is decided by the MXDW. A difference between the both drawing results is obvious. As above, there is a situation that, in a case where the same GDI drawing instruction is output from the GDI application, roughness of a tile image is different between processing using the GDI printer driver and processing using the V4 printer driver.

SUMMARY OF THE INVENTION

A print control apparatus includes: a reception unit configured to receive an XML Paper Specification (XPS) drawing instruction; a determination unit configured to determine whether a tile image drawing instruction is included in the received XPS drawing instruction, in a case where an application of an output source of the received XPS drawing instruction is a Graphics Device Interface (GDI) application; a modification unit configured to perform modification of the tile image drawing instruction so that resolution of a tile image with which pattern drawing is performed in accordance with the tile image drawing instruction is changed, in a case where the tile image drawing instruction is included in the received XPS drawing instruction; and an output unit configured to output, to a printer, a print command based on the modified tile image drawing instruction.

Further features of the disclosure will become apparent from the following description of exemplary embodiments with reference to the attached drawings.

BRIEF DESCRIPTION OF THE DRAWINGS

FIGS. 6A and 6B are views indicating an example of an XPS drawing instruction, which is used for the description of the exemplary embodiment 1.

FIG. 10 is a table indicating types and outlines of hatching included in a GDI drawing instruction, which is used for description of an exemplary embodiment 2.

FIG. 12 is a table indicating features of each tile image when a hatch drawing instruction is converted into a tile image drawing instruction by an MXDW, which is used for the description of the exemplary embodiment 2.

DESCRIPTION OF THE EMBODIMENTS

Hereinafter, modes for carrying out the aspect of the embodiments will be described by using drawings.

Exemplary Embodiment 1

For an exemplary embodiment described below, description will be given mainly for modification processing of a drawing instruction in a printer driver in a print processing system.

Figure 2:
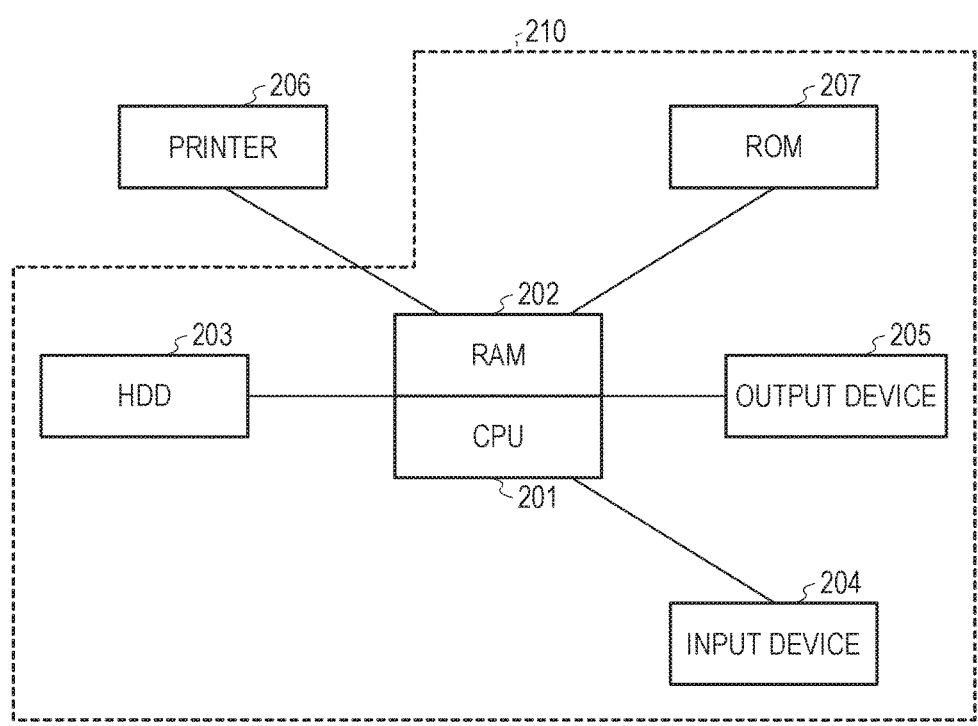
FIG. 2 is a block diagram illustrating an example of a print processing system, which is used for description of an exemplary embodiment 1.

FIG. 2 is a view illustrating a block diagram of the print processing system in the present exemplary embodiment. The print processing system has a CPU 201, a RAM 202, an HDD 203, an input device 204, an output device 205, a printer 206, and a ROM 207. The CPU 201 reads a program related to processing in the present exemplary embodiment and associated data from the HDD 203. Thereafter, in accordance with a system program (OS) loaded from the HDD 203 to the RAM 202 and an application program, the CPU 201 performs processing for information input from the input device 204 and outputs the information to the output device 205 or the printer 206. Note that, in the present exemplary embodiment, the output device 205 is a display device such as a display, and is distinguished from the printer 206. Moreover, the input device 204 is composed of a keyboard, a pointing device, a touch panel, and the like. Further, the HDD 203 may adopt any form as long as being a device which stores data. Respective blocks illustrated in FIG. 2 may be configured as one apparatus, or may be connected via a network. In an example of FIG. 2, the CPU 201, the RAM 202, the HDD 203, the input device 204, the output device 205, and the ROM 207 constitute a print control apparatus 210, and print data is output from the print control apparatus 210 to the printer 206.

Figure 3:
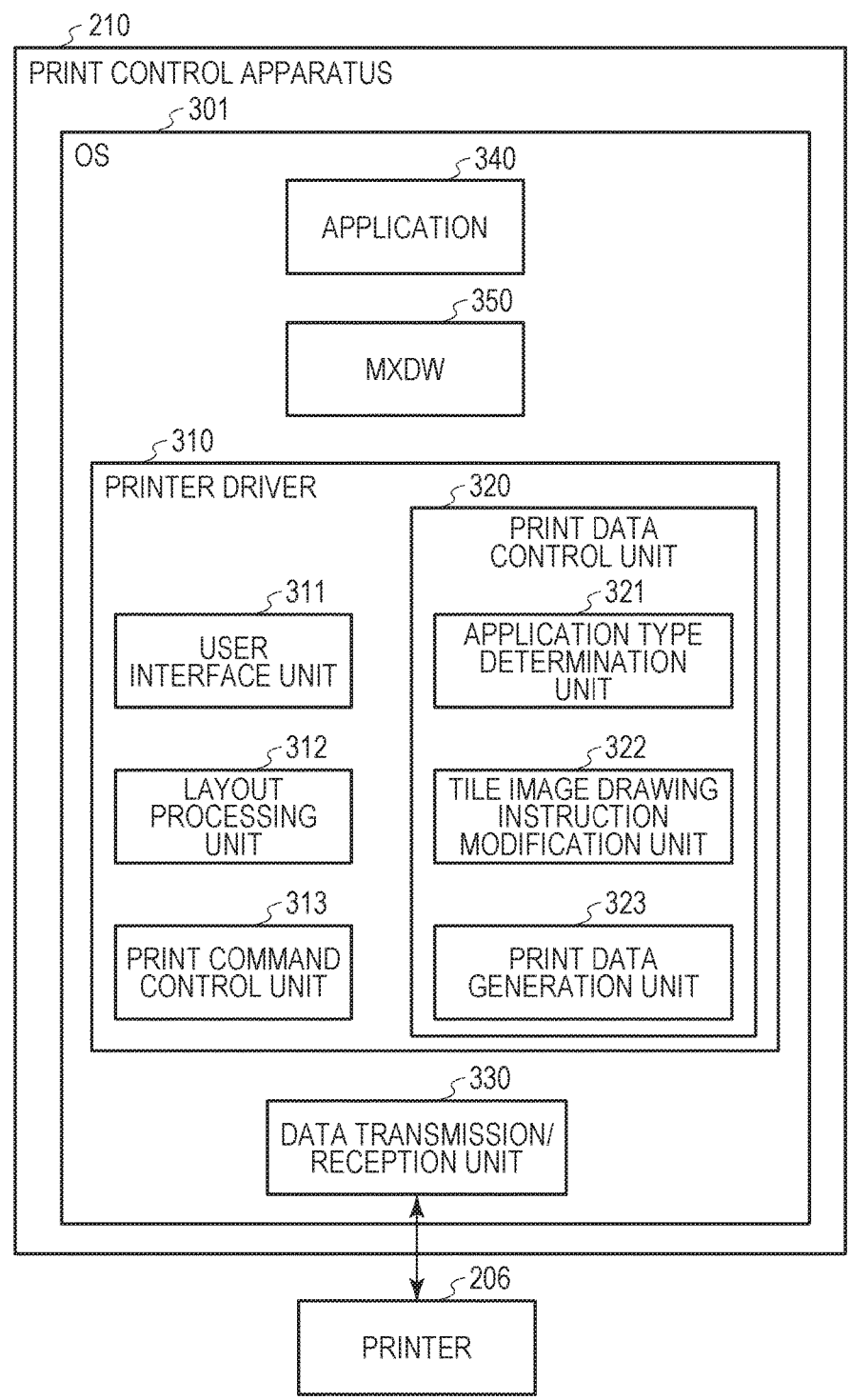
FIG. 3 is a block diagram illustrating a configuration of a print control apparatus, which is used for the description of the exemplary embodiment 1.

FIG. 3 is a block diagram illustrating details of the print control apparatus 210. The print control apparatus 210 has an OS (Operation System) 301. The print control apparatus 210 has a printer driver 310, a data transmission/reception unit 330, an application 340, and an MXDW 350 which function on the OS 301. The printer driver 310 includes a user interface unit 311, a layout processing unit 312, a print command control unit 313, and a print data control unit 320. The print data control unit 320 includes an application type determination unit 321, a tile image drawing instruction modification unit 322, and a print data generation unit 323. The print control apparatus 210 in which the OS 301 operates is connected to the printer 206 in a wired manner or a wireless manner, and data is exchanged therebetween.

The printer driver 310 in the present exemplary embodiment is a V4 printer driver, that is, a printer driver to which an XPS drawing instruction is input.

The application 340 is application software which creates document data and the like. The application 340 includes a GDI application which outputs a GDI drawing instruction and an XPS application which outputs an XPS drawing instruction. The XPS drawing instruction output from the XPS application is directly input to the printer driver 310. On the other hand, the GDI drawing instruction output from the GDI application is input to the MXDW (also referred to as an MXDC) 350. The MXDW 350 converts the GDI drawing instruction into an XPS drawing instruction. Then, the converted XPS drawing instruction is input to the printer driver 310.

Note that, for example, there is also a form in which a not-illustrated GDI printer driver and the printer driver 310, which is the V4 printer driver, coexist on the OS 301 and in which the OS 301 is to output a GDI drawing instruction toward the printer driver 310 selected by a user. That is, in a case where the application 340 is the GDI application, when the user selects the printer driver 310, which is the V4 printer driver, and gives a print instruction, the OS 301 is to output a GDI drawing instruction to the MXDW 350.

When this is viewed from a viewpoint of a side of the printer driver 310, there are a case in which an input XPS drawing instruction is one that is directly input from the XPS application and a case where it is an XPS drawing instruction obtained as a result of converting a GDI drawing instruction by the MXDW 350. In an example described below, description will be given mainly for an example in which the printer driver 310 performs processing according to whether the XPS drawing instruction is one that is output from the GDI application (that is, one that is converted by the MXDW 350).

Description of a configuration in FIG. 3 will be continued.

The user interface unit 311 is a user interface with which a user inputs various print setting such as setting with respect to the printer 206 or gives a print start instruction.

The layout processing unit 312 receives a drawing instruction designated from the application 340 and performs conversion related to layout such as N-up print.

The print data control unit 320 receives a drawing instruction designated from the layout processing unit 312, and creates print data which is capable of being processed in the printer 206. Note that, the processing of the print data control unit 320 may be performed before the processing in the layout processing unit 312.

The application type determination unit 321 determines whether the application 340 which has output a print instruction is the GDI application or the XPS application.

In a case where the application type determination unit 321 determines that the print instruction is from the GDI application and a tile image drawing instruction is input by being included in the print instruction, the tile image drawing instruction modification unit 322 performs modification of a tile image. In the other case, the tile image drawing instruction modification unit 322 outputs the drawing instruction to the print data generation unit 323 without modification. Description thereof will be given below.

The print data generation unit 323 generates print data such as bitmap data or PDL data by using the drawing instruction output from the tile image drawing instruction modification unit 322. That is, the print data generation unit 323 generates image data (bitmap data) subjected to rendering based on the modified tile image drawing instruction or generates PDL data indicating the drawing instruction including the modified tile image.

The print command control unit 313 generates a print command, which is adapted to the printer 206, by adding predetermined control information (for example, a version of a PDL, a 2 up instruction, or the like) to the print data generated by the print data generation unit 323, for example.

The data transmission/reception unit 330 is a function of the OS 301, and transmits/receives data to/from the printer 206. The data transmission/reception unit 330 transmits the print command generated by the print command control unit 313 to the printer 206.

The printer 206 performs print processing according to the print command which is transmitted from the data transmission/reception unit 330 of the print control apparatus 210 serving as a host apparatus which is connected thereto.

Next, an operation of the printer driver 310 will be described by using FIG. 4.

Figure 4:
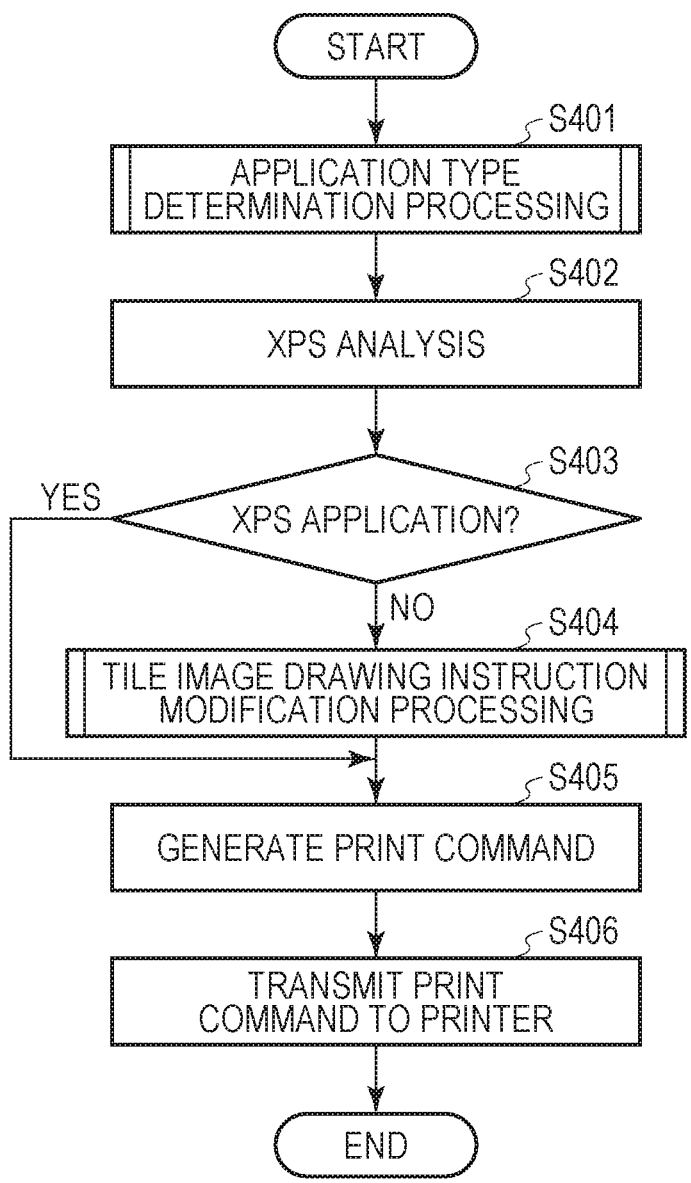
FIG. 4 is a flowchart illustrating processing of the print control apparatus, which is used for the description of the exemplary embodiment 1.

FIG. 4 is a flowchart illustrating the whole system of the present exemplary embodiment, and illustrates program processing of the printer driver 310. When a user activates the application 340 and inputs a print instruction, a drawing instruction is output from the application 340. Here, the drawing instruction transferred from the application 340 is converted into a drawing instruction in an XPS format by using the MXDW 350 which is a function of the OS 301 when necessary, and is input to the printer driver 310. FIG. 4 illustrates an example of processing after an XPS drawing instruction is input to the printer driver 310 in this manner. The processing illustrated in FIG. 4 is processing executed in the printer driver 310. Note that, from an aspect of hardware control, the processing illustrated in FIG. 4 is realized by reading a program of the printer driver 310, which is stored in the HDD 203, the ROM 207, or the like, into the RAM 202 and executing the program by the CPU 201. That is, the CPU 201 is to operate as each functional unit of the printer driver 310. Hereinafter, the flowchart will be described from an aspect of each functional unit of the printer driver 310.

At step S401, the printer driver 310 determines a type of an application which has output a print instruction. That is, the application type determination unit 321 determines whether the application of an output source, which has output the print instruction, is a GDI application or an XPS application. A method of determination will be described below.

Next, at step S402, the printer driver 310 analyzes an input XPS drawing instruction, and generates intermediate data. That is, the tile image drawing instruction modification unit 322 generates the intermediate data from the XPS drawing instruction. In this case, the intermediate data means data suitable for processing in the printer driver 310. As a rough outline of processing, the intermediate data is generated from the XPS drawing instruction, and print data is generated from the intermediate data. As described above, the print data to be generated is a bitmap image in some cases, or PDL data in other cases.

At step S403, the printer driver 310 advances the processing to step S405 in a case where, as a result of the determination at step S401, the application which has output the print instruction is determined as the XPS application. On the other hand, in a case where the application which has output the print instruction is determined as the GDI application, the printer driver 310 advances the processing to step S404.

At step S404, the tile image drawing instruction modification unit 322 modifies a tile image drawing instruction. A method of this modification will be described below by using FIG. 8. Thereafter, the processing moves to step S405.

At step S405, the printer driver 310 converts the intermediate data into a print command which is capable of being received by the printer 206. That is, in a case where the tile image drawing instruction is modified, the intermediate data subjected to the modification is converted into the print command. In other words, the print data generation unit 323 generates the print data from the intermediate data output from the tile image drawing instruction modification unit 322, and thereafter the print command control unit 313 generates the print command from the generated print data.

At step S406, the printer driver 310 transmits the print command generated at step S405 to the printer 206. That is, the data transmission/reception unit 330 transmits the print command to the printer 206.

Note that, in the example of FIG. 4, described is an example in which determination as to whether the application of the output source, which has output the print instruction, is the GDI application or the XPS application is made first and thereafter determination as to whether a tile image drawing instruction is included is made. However, there is no limitation thereto, and the processing may be performed so that the determination as to a tile image drawing instruction is included is made first, and thereafter the determination as to the application type is made.

Figure 5:
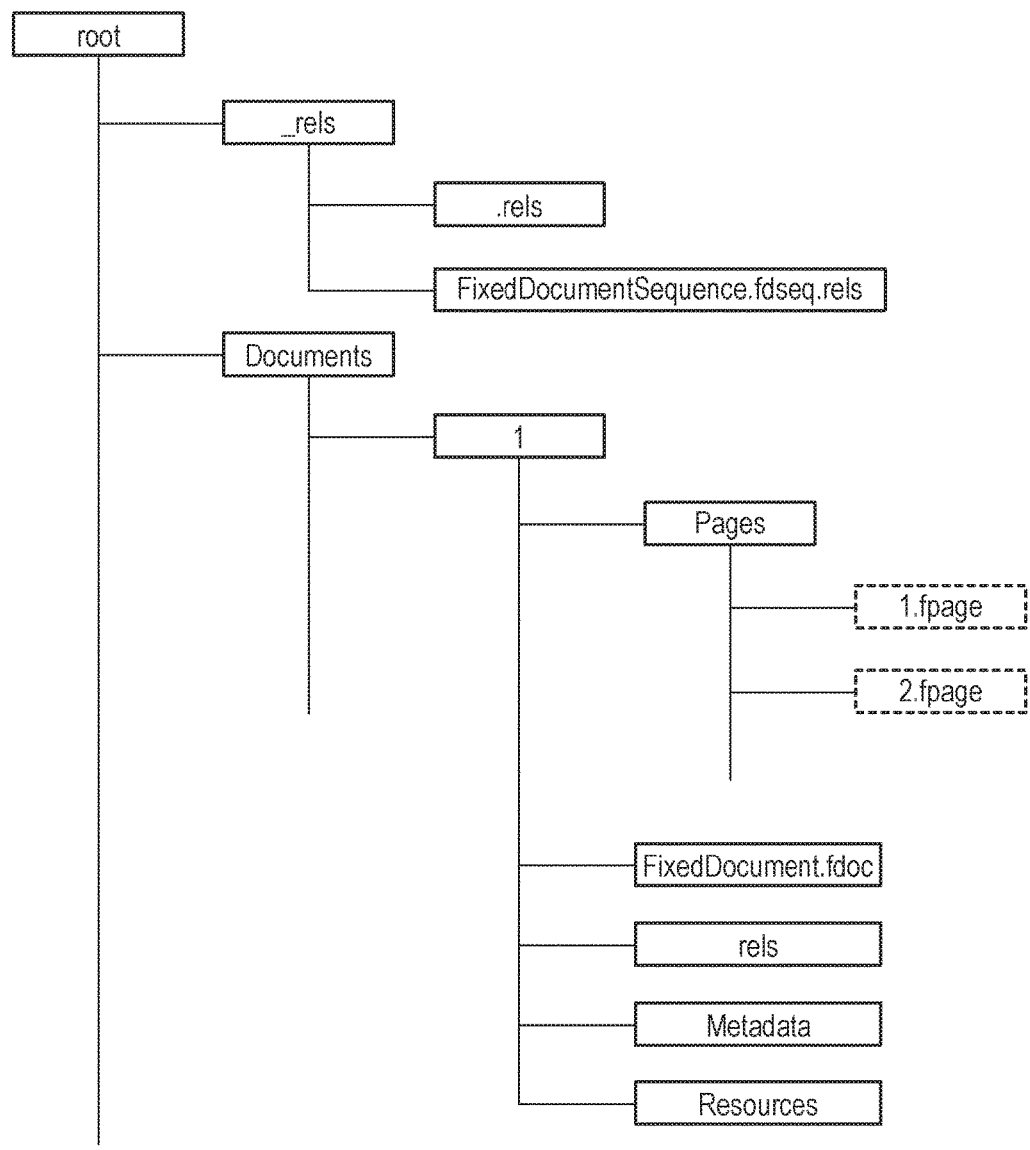
FIG. 5 is a view illustrating an example of a hierarchical structure of an XPS file, which is used for the description of the exemplary embodiment 1.

An XPS file which is an electronic document format of data including an XPS drawing instruction will be simply described here by using FIG. 5. An XPS is specification of the electronic document format, which is described in an XML format. The XPS file is a file which is described in accordance with this specification. In the XPS, all of document information is described in the XML format, and a plurality of files for each described content are compressed so as to be one package of a zip file. FIG. 5 is a view illustrating an example of a hierarchical structure of the XPS file. Note that, the hierarchical structure is illustrated with a part of portion which is not necessary for description omitted.

The hierarchical structure of the XPS file is defined in the specification, and there are folders such as "_rels" and "Documents" in a first layer under a root folder. Reference information to FixedDocumentSequence.fdsep.rels, in which configuration information of one piece of document data is described, is included in "_rels". A folder which indicates each document included in one XPS file (in an example of FIG. 5, a folder of "1", which indicates one document) is included in "Documents". The folder indicating each document (for example, "1") has document configuration information of the document, which is "FixedDocument.fdoc". Moreover, the folder indicating each document also has a "Pages" folder in which information of each page constituting the document is stored, a "Resources" folder, and the like. In each document configuration information of "FixedDocument.fdoc", reference information of each page under a layer of the "Pages" folder is described.

One piece of page information is described in each of "1.fpage" and "2.fpage". Reference information to data stored in the "Resources" folder is described therein when necessary. For example, in the case of a tile image drawing instruction of pattern drawing of a tile image in a predetermined region, the tile image is stored in the "Resources" folder, and reference information of this tile image is described. FIG. 6A corresponds to "1.fpage" of FIG. 5, which is one file stored in the "Pages" folder.

FIG. 6A indicates an example of a drawing instruction including an example of a tile image drawing instruction. In description 601, <!--Microsoft XPS Document Converter (MXDC) Generated! Version: 0.3.9600.17415--> is described. From this description, it is found that a creation source which creates the XPS file is an XPS file which is generated with an MXDW which is manufactured by Microsoft (registered trademark) and whose version is 0.3.9600.17415. In addition, in the XPS file, it is possible to describe a print condition in each document and each page. The print condition is referred to as a print ticket. FIG. 6B is a view indicating an example of the print ticket. With reference to description 610, it is found that the XPS file is generated with an MXDW.

Figure 1A:
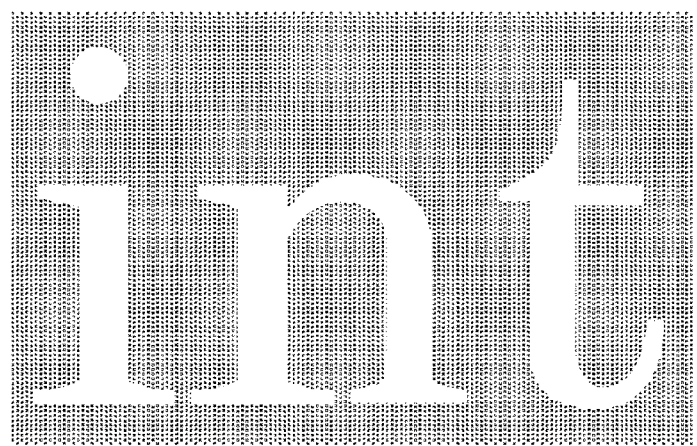
FIGS. 1A, 1B, and 1C are views illustrating an example in which output results are different between a GDI printer driver and a V4 printer driver.
Figure 1B:
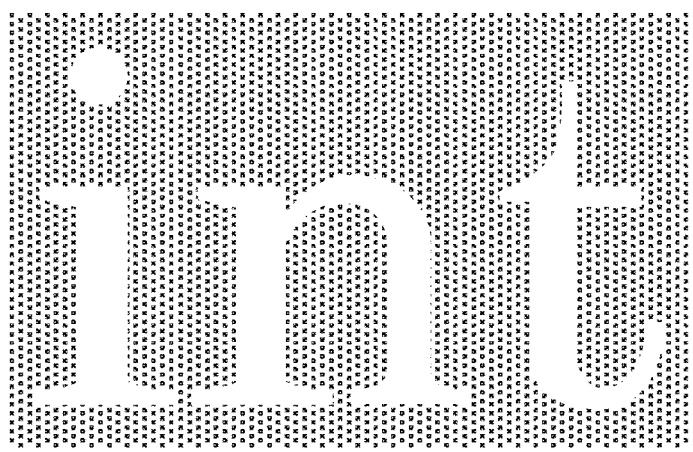
Figure 1C:
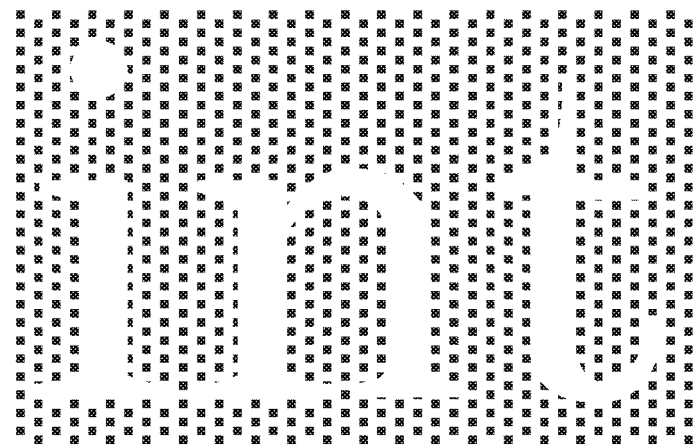

Note that, description items of the tile image drawing instruction are described in description 602 of FIG. 6A, and ImageBrush is a pattern drawing instruction. Moreover, 1.PNG in description 603 indicates reference to a tile image. With an XPS drawing instruction input from the MXDW 350, this tile image is input to the printer driver 310 as an image created by the MXDW 350 with fixed resolution. That is, the MXDW 350 interprets a GDI drawing instruction, converts an image, with which pattern drawing is performed, into image data with resolution of 150 dpi (in the example of FIG. 6A, "1.PNG"), and outputs the image data to the printer driver 310. A drawing result according to such a pattern drawing instruction of a tile image with fixed resolution is to be different from that of processing using a GDI printer driver, as illustrated in FIGS. 1A, 1B, and 1C. In the present exemplary embodiment, processing by which such a difference in output results is reduced is performed. Description thereof will be given in detail below.

Figure 7:
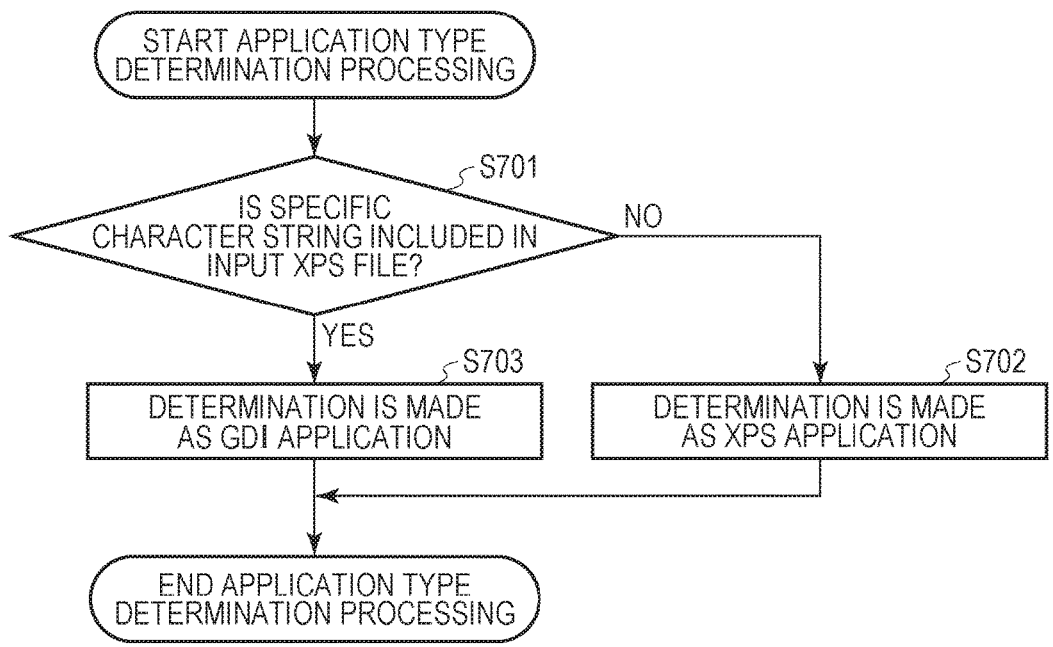
FIG. 7 is a flowchart of application type determination processing, which is used for the description of the exemplary embodiment 1.

Next, details of the application type determination processing at step S401 will be described. FIG. 7 is a flowchart of XPS application type determination processing, which is called from S401 of FIG. 4. This processing is performed by the application type determination unit 321 in FIG. 3.

At step S701, the application type determination unit 321 determines whether or not a specific character string is included in an input XPS file. As indicated in the above-described example of FIG. 6A, the determination is made as to whether or not the description 601 is described in "1.fpage" of FIG. 5. Needless to say, a target page of the determination is not limited to a first page ("1.fpage"), and the determination may be made based on whether or not a specific character string is included in a different page (for example, "2.fpage" or the like). Further, the determination may be made based on whether or not what the description 610 of FIG. 6B indicates is included in the print ticket. In the case of determining, at step S701, that the specific character string is not included, the application type determination unit 321 determines, at step S702, that the XPS drawing instruction input to the printer driver 310 is not generated by the MXDW 350. Accordingly, the application type determination unit 321 determines that the XPS drawing instruction input to the printer driver 310 is a drawing instruction which originated from the XPS application, and ends the flowchart. In the case of determining, at step S701, that the specific character string is included, the application type determination unit 321 determines, at step S702, that the input XPS file is generated by the MXDW 350. Accordingly, the application type determination unit 321 determines that the XPS drawing instruction input to the printer driver 310 is a drawing instruction which originated from the GDI application, and ends the flowchart.

The above is the application type determination processing, and it is possible to determine whether or not an application with which a user has input a print instruction is the XPS application.

Figure 8:
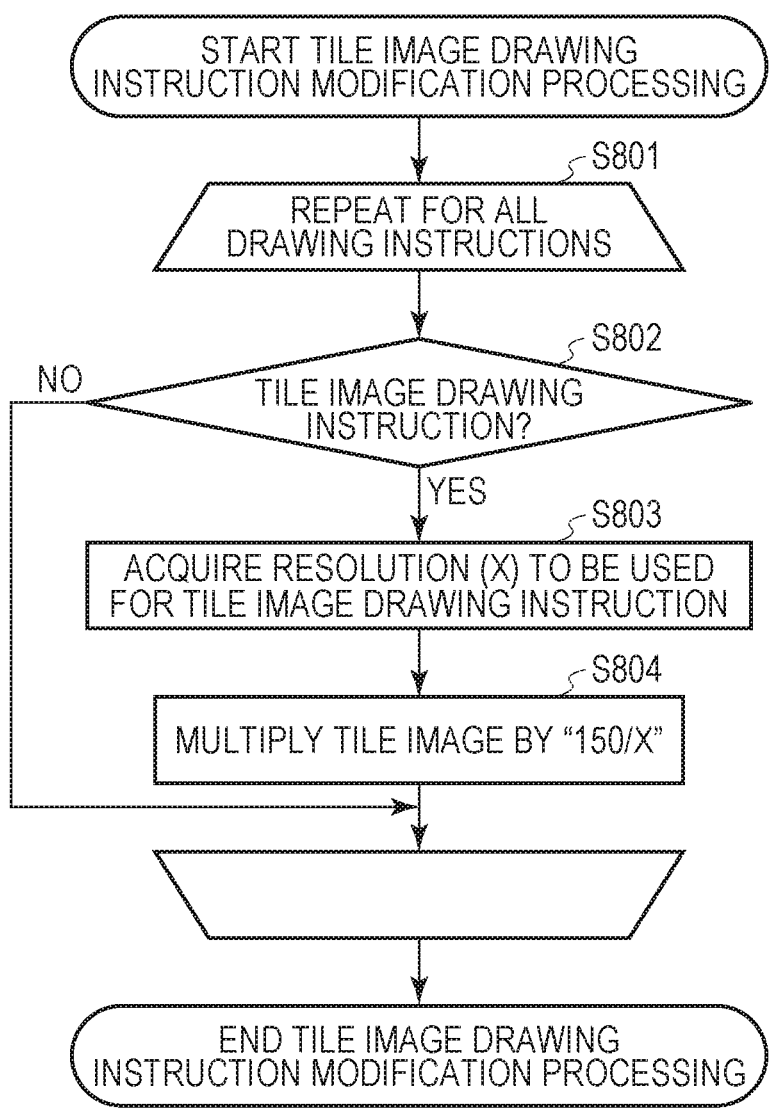
FIG. 8 is a flowchart of tile image drawing instruction modification processing, which is used for the description of the exemplary embodiment 1.

FIG. 8 is a flowchart of the tile image drawing instruction modification processing, which is called from S404 of FIG. 4. This processing is performed by the tile image drawing instruction modification unit 322 in FIG. 3. The tile image drawing instruction modification unit 322 repeats steps S802 to S804 for all drawing instructions (S801).

At step S802, the tile image drawing instruction modification unit 322 determines whether or not the drawing instruction is the tile image drawing instruction. It is possible to determine whether or not to be the tile image drawing instruction, based on whether or not there is description of an ImageBrush instruction which is indicated in FIG. 6A, for example. In a case where the drawing instruction is not the tile image drawing instruction, the processing is advanced to next drawing, and in a case where it is the tile image drawing instruction, the processing is advanced to step S803.

Figure 9:
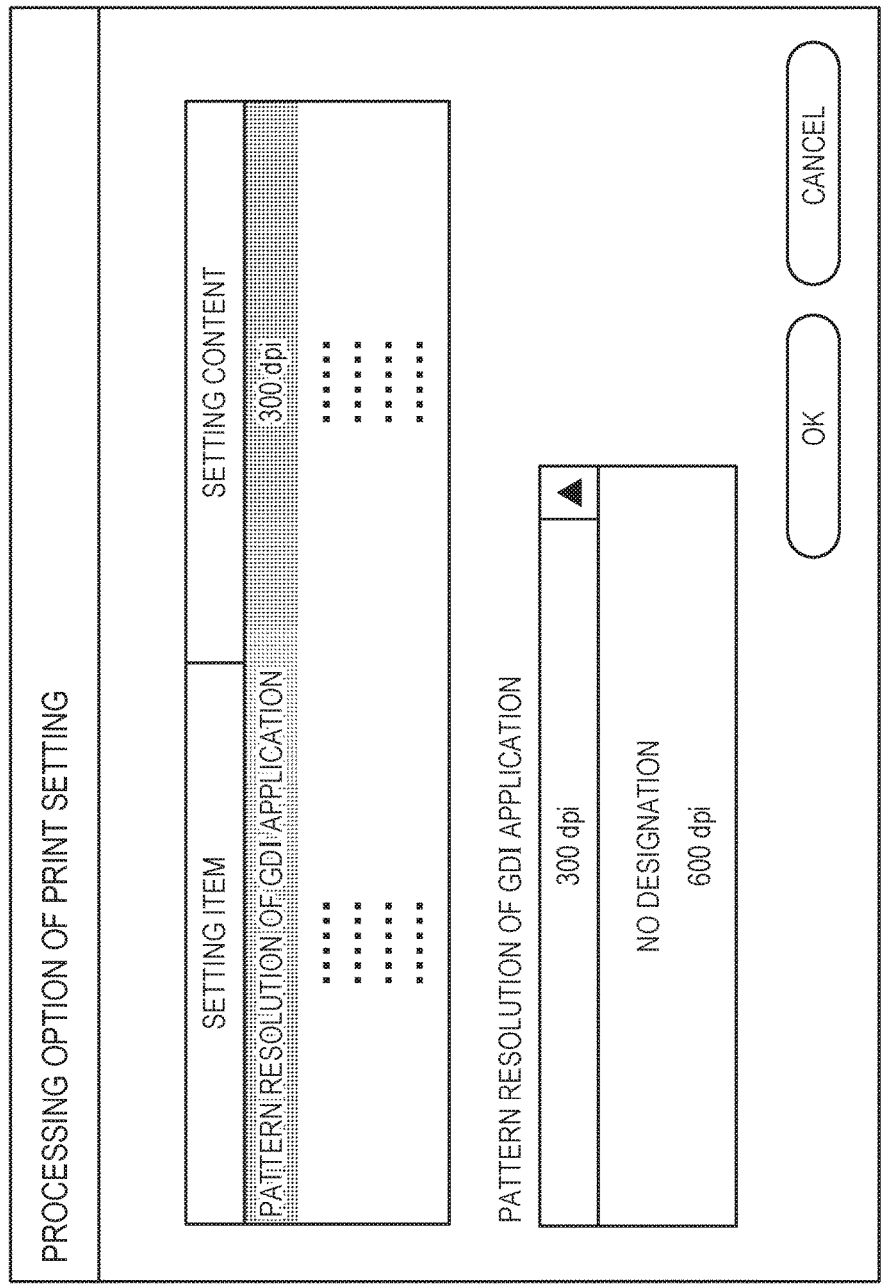
FIG. 9 is a view illustrating an example of a UI with which resolution of a tile image is designated, which is used for the description of the exemplary embodiment 1.

At step S803, the tile image drawing instruction modification unit 322 acquires resolution of a tile image to be used for the tile image drawing instruction. In the present exemplary embodiment, similarly to the GDI printer driver, a configuration by which a user is able to designate the resolution of the tile image through a UI screen is provided. FIG. 9 is a view illustrating an example of the UI screen of the printer driver 310, and illustrates a screen with which a user is able to set print setting. The designated pattern resolution to be acquired at step S803 has a value which is designated by a user from the UI screen with which print setting is performed as illustrated in FIG. 9. In a case where such a UI is not included, certain resolution may be held in the printer driver 310, and a value thereof may be decided to be used as the designated pattern resolution. The designated pattern resolution of the tile image, which is acquired here, is set as X (dpi).

At step S804, the tile image drawing instruction modification unit 322 performs modification by which the tile image (in the example of FIG. 6A, "1.PNG") which is referred to in the tile image drawing instruction is converted by being multiplied by 150/X. That is, the tile image which has been converted so as to have a predetermined fixed value (in this case, 150 dpi) by the MXDW 350 is converted so as to have an output size similar to that of resolution designated in the GDI printer driver. For example, conversion is performed so that a size of each tile image becomes {(fixed resolution converted by the MXDW 350)/(the designated pattern resolution)}. Note that, magnification of the conversion does not need to be 150/X precisely, and some latitude may be allowed. By allowing some latitude, it is possible to suppress drawing omission due to magnification/reduction of the tile image, which has not been assumed, or deterioration in the tile image. In addition, in the case of a form in which the MXDW 350 performs conversion with another fixed resolution different from the resolution of 150 dpi, conversion processing using resolution corresponding to the form may be performed. The above is the flowchart of the tile image drawing instruction modification processing.

As above, the tile image drawing instruction modification processing is processing by which a tile image to be referred to by a tile image drawing instruction is converted with a predetermined magnification. Thus, in the example of this processing, a region (size) of a drawing target or a drawing instruction itself, each of which is included in the tile image drawing instruction, does not change. However, the tile image drawing instruction modification processing is not limited to the example. For example, processing by which a region of a drawing target in which a tile image is drawn is enlarged, pattern drawing of the tile image is performed therein, and the region is reduced may be performed. Moreover, both of processing by which a drawing instruction itself changes and processing by which a tile image is converted may be executed. In any form, in the case of a tile image drawing instruction of an XPS drawing instruction which originated from a GDI application, modification is performed so that, as a result, pattern drawing is performed with certain resolution designated with a driver similarly to a GDI printer driver.

In addition, data to be transmitted to the printer 206 may be data obtained by converting a drawing instruction into bitmap image data in the printer driver 310, or may be PDL data suitable for the printer 206. With data in any form, drawing of a tile image subjected to modification is to be performed.

As above, in the present exemplary embodiment, also in a case where an application which has executed printing is a GDI application, by modifying a tile image drawing instruction whose resolution is made to be different by the MXDW 350, it becomes possible to obtain an output similar to the case of using a GDI printer driver.

That is, according to the aspect of the embodiments, it is possible to reduce a difference between an output result obtained by using a GDI printer driver and an output result obtained by using a V4 printer driver, when printing is performed based on a drawing instruction output from a GDI application.

Exemplary Embodiment 2

In the exemplary embodiment 1, the example in which a tile image of a tile image drawing instruction is converted with a constant magnification is described. This is processing assuming that a GDI drawing instruction with which pattern drawing of a bitmap image, which is called a bitmap brush, is performed is converted into a tile image drawing instruction (XPS drawing instruction) as indicated in FIG. 6A.

On the other hand, types of pattern drawing instructions (GDI drawing instructions) to be output by a GDI application include a hatch drawing instruction in addition to the bitmap brush. The hatch drawing instruction is also converted into a tile image drawing instruction (XPS drawing instruction) by the MXDW 350. Here, as indicated in FIG. 10, there are six types of hatch drawing instructions, and the hatch drawing instruction is an instruction whose drawing content is also predefined in an outline. That is, the hatch drawing instruction has a format in which an image targeted for pattern drawing is not included in a drawing instruction. Accordingly, in a case where the hatch drawing instruction is transferred, a GDI printer driver independently holds or creates an image for use as a tile image. However, in a V4 printer driver, in a state of being created by the MXDW 350, the tile image is input to the printer driver as a tile image drawing instruction. Therefore, a drawing content is not coincident with that of the GDI printer driver. In an exemplary embodiment 2, a solution for this case will be described.

In the present exemplary embodiment 2, processing of the tile image drawing instruction modification unit 322 is different from that of the exemplary embodiment 1. Since the other configurations and the like are similar to those which have been described in the exemplary embodiment 1, description thereof will be omitted here.

Figure 11:
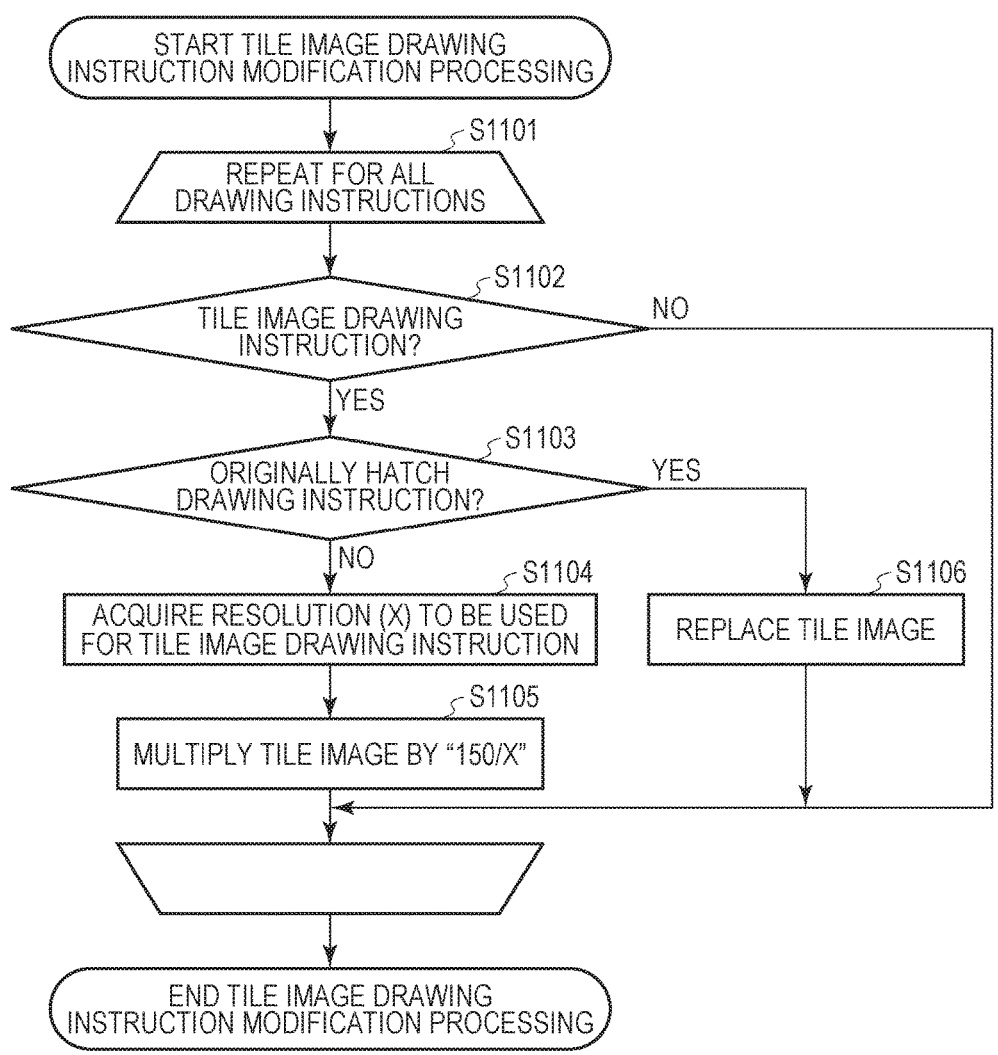
FIG. 11 is a flowchart of tile image drawing modification processing, which is used for the description of the exemplary embodiment 2.

FIG. 11 is a flowchart of tile image drawing instruction modification processing, which is called from S404 of FIG. 4. This processing is performed by the tile image drawing instruction modification unit 322 in FIG. 3. The tile image drawing instruction modification unit 322 repeats steps S1102 to S1106 for all drawing instructions (S1101).

At step S1102, the tile image drawing instruction modification unit 322 determines whether or not the drawing instruction is a tile image drawing instruction. In a case where the drawing instruction is not the tile image drawing instruction, the processing moves to a next drawing instruction, and, in a case where it is the tile image drawing instruction, the processing moves to step S1103.

At step S1103, the tile image drawing instruction modification unit 322 determines whether or not the input tile image drawing instruction was originally a hatch drawing instruction. That is, the tile image drawing instruction modification unit 322 determines whether or not the tile image drawing instruction was a hatch drawing instruction before being converted by the MXDW 350. FIG. 12 is a table of features of each tile image when a hatch drawing instruction is converted into a tile image drawing instruction by the MXDW 350.

For example, in a GDI drawing instruction, a hatch drawing instruction whose hatching ID is HS_HORIZONTAL is to have a tile image generated by conversion by the MXDW 350, and is to be converted into a tile image drawing instruction which instructs drawing of the tile image in a predetermined range. Features of tile images which are generated in this manner are as indicated in FIG. 12. That is, a size (pixel) of a tile image which is generated when the MXDW 350 converts a hatch drawing instruction of HORIZONTAL is 8*40. In addition, amplitude (XPS coordinates) of the tile image to be generated is 1.28*6.4. Feature 1 and feature 2 which are indicated in FIG. 12 have a difference in that a size (amplitude) of a tile image is expressed with Pixel or XPS coordinates, and both of them indicate the same content. Accordingly, the tile image drawing instruction modification unit 322 first determines whether or not a tile image has a size or amplitude that matches with the feature 1 or the feature 2 as indicated in FIG. 12. In a case where the size or the amplitude of the tile image matches with the feature 1 or the feature 2, the content of the tile image, which is indicated in FIG. 12, is referred to, and determination is made as to whether or not a drawing content is the same as the tile image indicated in FIG. 12. In the case of the same drawing content, determination is made that the input tile image drawing instruction was a hatch drawing instruction before being converted by the MXDW 350.

In a case where the drawing instruction before the conversion by the MXDW 350 is not a hatch drawing instruction, the processing is advanced to step S1104 and S1105. Since steps S1104 and S1105 are similar to step S803 and step S804 in FIG. 8, respectively, description thereof will be omitted. In a case where the drawing instruction before the conversion by the MXDW 350 is a hatch drawing instruction, the processing is advanced to step S1106.

At step S1106, the tile image drawing instruction modification unit 322 replaces the tile image included in the tile image drawing instruction with an image which has been held independently or is generated instantly. At this time, by replacing the tile image with an image whose type of hatching determined at step S1103 is the same as what is used in the GDI printer driver, it is possible to make output results of the V4 printer driver and the GDI printer driver coincident. That is, the printer driver 310 holds data of a tile image or information of the tile image, each of which is used by the GDI printer driver when performing processing of a hatch drawing instruction (GDI drawing instruction) indicated in FIG. 10. Then, the printer driver 310 uses the same tile image as that of the GDI printer driver, and it is thereby possible to make the output results of the V4 printer driver and the GDI printer driver coincident.

As above, according to the present exemplary embodiment, even in a case where an application which has executed printing is a GDI application and a hatch drawing instruction is included, it is possible to obtain similar outputs between a V4 printer driver and a GDI printer driver.

Exemplary Embodiment 3

In the exemplary embodiments 1 and 2, description has been given on the presumption that, when outputting a tile image drawing instruction, the MXDW 350 converts a tile image so as to have resolution of 150 dpi. However, in the future, there is a possibility that resolution designation of a tile image becomes possible in the MXDW 350. In this case, when performing the processing of the exemplary embodiment 1 or 2, a drawing result of the tile image becomes different compared with that of a GDI printer driver. In an exemplary embodiment 3, a solution in this case will be described. Note that, in the present exemplary embodiment, processing of the application type determination unit 321 is different from that of the exemplary embodiment 1. Since the other configurations and the like are similar to those which have been described in the exemplary embodiment 1 or the exemplary embodiment 2, description thereof will be omitted here.

Figure 13:
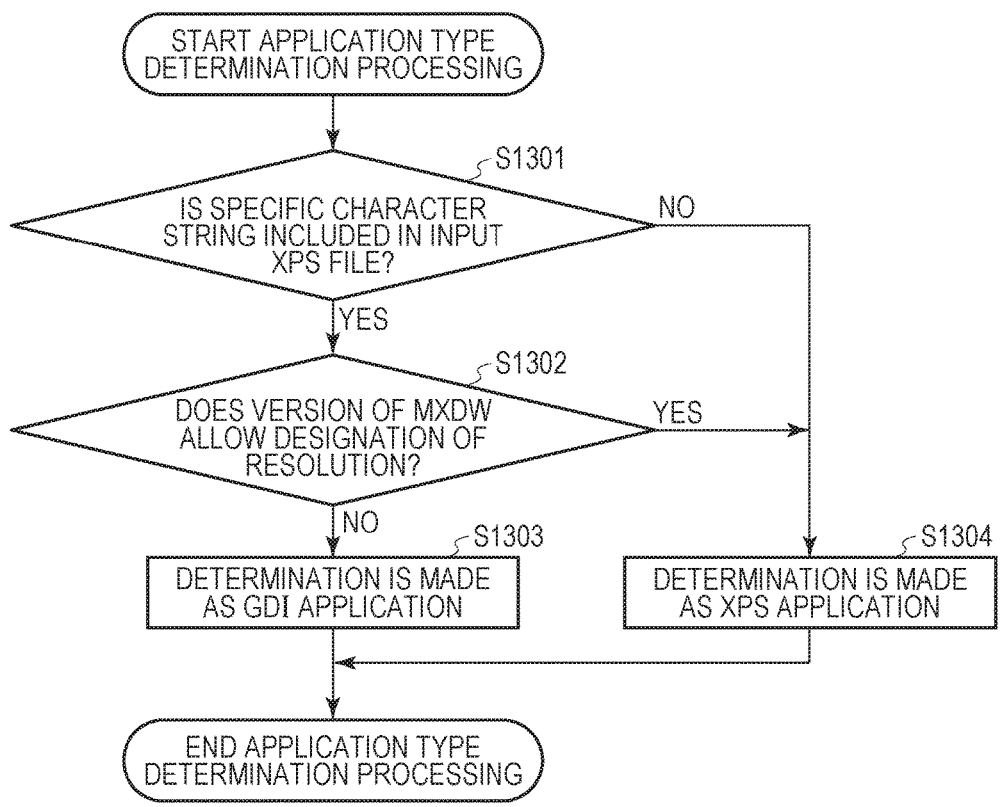
FIG. 13 is a flowchart of application type determination processing, which is used for description of an exemplary embodiment 3.

FIG. 13 is a flowchart of application type determination processing, which is called from S401 of FIG. 4. This processing is performed by the application type determination unit 321 in FIG. 3.

At step S1301, the application type determination unit 321 determines whether or not a specific character string is included in an input XPS file. This is similar to the processing of step S701 of FIG. 7, which is described above. In the case of determining, at step S1301, that the specific character string is not included, at step S1304, the application type determination unit 321 determines that the XPS file input to the printer driver 310 is not generated by the MXDW 350. Accordingly, the application type determination unit 321 determines that the XPS file input to the printer driver 310 is printing which is from the XPS application, and ends the flowchart.

In the case of determining, at step S1301, that the specific character string is included, at step S1302, the application type determination unit 321 focuses on a version of the MXDW 350, which is described in FIG. 6A, and determines whether the version of the MXDW 350 allows designation of resolution.

In the case of determining, at step S1302, that the version allows the designation of resolution, the processing is advanced to step S1304. At step S1304, the application type determination unit 321 determines, for convenience, that the XPS file input to the printer driver 310 is printing from the XPS application, and ends the flowchart. In the case of determining, at step S1302, that the version of the MXDW 350 is a version which does not allow the designation of resolution, the processing is advanced to step S1303. At step S1303, the application type determination unit 321 determines, for convenience, that the XPS file is printing from the GDI application.

Note that, what is performed here is merely processing by which, according to whether or not the version of the MXDW 350 is the version which allows designation of resolution, the XPS file is regarded to be from the XPS application or regarded to be from the GDI application for convenience. This is because, in a case where determination is made that the printing is from the XPS application, as indicated in FIG. 4, the tile image modification processing of step S404 is not performed, so that pattern drawing is performed with a tile image having designated resolution. Needless to say, a method of changing determination processing at step S404 and switching subsequent processing based on a type and a version of an application may be adopted.

Note that, the processing by which an XPS file is analyzed and a version of the MXDW 350 is determined has been described here. However, determination may be made such that, by acquiring an ability value of the MXDW 350, printing is from the XPS application in a case where resolution is able to be designated, and printing is from the GDI application in the other case. For example, an API which inquires, from the printer driver 310, whether or not resolution is able to be designated in the MXDW 350 may be mounted on the OS 301, and processing may be performed based on a result of inquiring, via the API, whether or not the resolution is able to be designated in the MXDW 350.

Other Exemplary Embodiments

A function of switching a valid state and an invalid state of a function of performing modification of a tile image drawing instruction, which has been described in each of the aforementioned exemplary embodiments, may be provided. For example, configuration in which whether to set the function to be in the valid state or the invalid state is able to be switched in accordance with an input by a user in the user interface unit 311 of the printer driver 310 may be provided. In addition, in a case where the function of performing modification of a tile image drawing instruction is brought into the invalid state, processing of bringing an item of pattern resolution of a GDI application illustrated in FIG. 9 into an invalid state, for example, with gray-out may be performed in conjunction.

The disclosure is able to be realized by processing by which a program which realizes one or more functions of the above-described exemplary embodiments is supplied to a system or an apparatus via a network or a recording medium and one or more processors in a computer of the system or the apparatus reads out and executes the program. Further, the disclosure is also able to be realized by a circuit (for example, an ASIC) which realizes one or more functions.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-235017 filed on Dec. 1, 2015, which is hereby incorporated by reference herein in its entirety.

What is claimed is:

1. A print control apparatus, comprising:
a memory for storing a printer driver; and
a processor for executing the printer driver to perform:
receiving an XML Paper Specification (XPS) drawing instruction;
determining whether an application of an output source of the received XPS drawing instruction is a Graphics Device Interface (GDI) application;
determining whether a tile image drawing instruction is included in the received XPS drawing instruction, wherein the tile image drawing instruction instructs performing a pattern drawing for drawing repeatedly with a tile image in a designated region;
performing modification of the tile image drawing instruction in the received XPS drawing instruction so that resolution of the tile image with which the pattern drawing is performed in accordance with the tile image drawing instruction is changed, in a case where it is determined that the application of the output source of the received XPS drawing instruction is a GDI application and it is determined that the tile image drawing instruction is included in the received XPS drawing instruction; and
outputting, to a printer, a print command generated from the XPS drawing instruction that includes the modified tile image drawing instruction.

2. The print control apparatus according to claim 1, wherein the modification changes a size of the tile image included in the tile image drawing instruction so that the resolution of the tile image with which the pattern drawing is performed in accordance with the tile image drawing instruction is changed.

3. The print control apparatus according to claim 2, wherein the modification converts the size of the tile image so as to have a fixed resolution.

4. The print control apparatus according to claim 2, wherein the modification converts the size of the tile image so as to have a designated pattern resolution, and wherein the designated pattern resolution is decided based on designation which is performed via a user interface.

5. The print control apparatus according to claim 2, wherein the modification converts the size of the tile image so as to have a designated pattern resolution, and wherein the designated pattern resolution is decided based on a value which is set in advance.

6. The print control apparatus according to claim 1, wherein it is determined that the application of the output source is a GDI application, in a case where a specific character string is included in an XPS file which describes the received XPS drawing instruction.

7. The print control apparatus according to claim 6, wherein the specific character string is a character string related to a converter that converts a GDI drawing instruction into an XPS drawing instruction.

8. The print control apparatus according to claim 1, wherein
the processor executes the printer driver to further determine whether or not the tile image drawing instruction is a drawing instruction which originated from a hatch drawing instruction in a GDI drawing instruction, in a case where the tile image drawing instruction is included in the received XPS drawing instruction, and
wherein the modification modifies the tile image drawing instruction into a drawing instruction which uses, instead of the tile image included in the received XPS drawing instruction, an image corresponding to the hatch drawing instruction, in a case where it is determined that the tile image drawing instruction is the drawing instruction which originated from the hatch drawing instruction.

9. The print control apparatus according to claim 8, wherein the processor determines that the tile image drawing instruction is the drawing instruction which originated from the hatch drawing instruction, in a case where a size of the tile image included in the tile image drawing instruction satisfies a predetermined condition and the tile image is an image identical with a predetermined image.

10. The print control apparatus according to claim 1, wherein
the processor executes the printer driver to further determines whether a version of a Microsoft XPS Document Writer (MXDW) which generates the XPS drawing instruction is a predetermined version, in a case where the tile image drawing instruction is included in the received XPS drawing instruction, and wherein the modification is not performed, in a case where it is determined that the version of the MXDW is the predetermined version.

11. A print control method performed using a printer driver, the method comprising:
receiving an XML Paper Specification (XPS) drawing instruction;
determining whether an application of an output source of the received XPS drawing instruction is a Graphics Device Interface (GDI) application;
determining whether a tile image drawing instruction is included in the received XPS drawing instruction, wherein the tile image drawing instruction instructs performing a pattern drawing for drawing repeatedly with a tile image in a designated region;
performing modification of the tile image drawing instruction in the received XPS drawing instruction so that resolution of the tile image with which the pattern drawing is performed in accordance with the tile image drawing instruction is changed, in a case where it is determined that the application of the output source of the received XPS drawing instruction is a GDI application and it is determined that the tile image drawing instruction is included in the received XPS drawing instruction; and
outputting, to a printer, a print command generated from the modified tile image drawing instruction.

12. The print control method according to claim 11, wherein the modification changes a size of the tile image included in the tile image drawing instruction so that the resolution of the tile image with which the pattern drawing is performed in accordance with the tile image drawing instruction is changed.

13. The print control method according to claim 11, wherein it is determined that the application of the output source is a GDI application, in a case where a specific character string is included in an XPS file which describes the received XPS drawing instruction.

14. The print control method according to claim 11, further comprising:
determining whether or not the tile image drawing instruction is a drawing instruction which originated from a hatch drawing instruction in a GDI drawing instruction, in a case where the tile image drawing instruction is included in the received XPS drawing instruction,
wherein the modification modifies the tile image drawing instruction into a drawing instruction which uses, instead of the tile image included in the received XPS drawing instruction, an image corresponding to the hatch drawing instruction, in a case where it is determined that the tile image drawing instruction is the drawing instruction which originated from the hatch drawing instruction.

15. The print control method according to claim 11, further comprising:
determining whether a version of a Microsoft XPS Document Writer (MXDW) which generates the XPS drawing instruction is a predetermined version, in a case where the tile image drawing instruction is included in the received XPS drawing instruction,
wherein the modification is not performed, in a case where it is determined that the version of the MXDW is the predetermined version.

16. A non-transitory computer-readable storage medium storing a printer driver program that causes a computer to perform:
receiving an XML Paper Specification (XPS) drawing instruction;
determining whether an application of an output source of the received XPS drawing instruction is a Graphics Device Interface (GDI) application;
determining whether a tile image drawing instruction is included in the received XPS drawing instruction, wherein the tile image drawing instruction instructs performing a pattern drawing for drawing repeatedly with a tile image in a designated region;
performing modification of the tile image drawing instruction in the received XPS drawing instruction so that resolution of the tile image with which the pattern drawing is performed in accordance with the tile image drawing instruction is changed, in a case where it is determined that the application of the output source of the received XPS drawing instruction is a GDI application and it is determined that the tile image drawing instruction is included in the received XPS drawing instruction; and
outputting, to a printer, a print command generated from the modified tile image drawing instruction.

17. The non-transitory computer-readable storage medium according to claim 16, wherein the modification changes a size of the tile image included in the tile image drawing instruction so that the resolution of the tile image with which the pattern drawing is performed in accordance with the tile image drawing instruction is changed.

18. The non-transitory computer-readable storage medium according to claim 16, wherein it is determined that the application of the output source is a GDI application, in a case where a specific character string is included in an XPS file which describes the received XPS drawing instruction.

19. The non-transitory computer-readable storage medium according to claim 16, wherein the printer driver program further causes the computer to perform:
determining whether or not the tile image drawing instruction is a drawing instruction which originated from a hatch drawing instruction in a GDI drawing instruction, in a case where the tile image drawing instruction is included in the received XPS drawing instruction,
wherein the modification modifies the tile image drawing instruction into a drawing instruction which uses, instead of the tile image included in the received XPS drawing instruction, an image corresponding to the hatch drawing instruction, in a case where it is determined that the tile image drawing instruction is the drawing instruction which originated from the hatch drawing instruction.

20. The non-transitory computer-readable storage medium according to claim 16, wherein the printer driver program further causes the computer to perform:
determining whether a version of a Microsoft XPS Document Writer (MXDW) which generates the XPS drawing instruction is a predetermined version, in a case where the tile image drawing instruction is included in the received XPS drawing instruction,
wherein the modification is not performed, in a case where the version of the MXDW is the predetermined version.

* * * * *